(12) United States Patent
Pankaew et al.

(10) Patent No.: US 12,387,752 B2
(45) Date of Patent: *Aug. 12, 2025

(54) SUSPENSION DAMPING

(71) Applicant: Magnecomp Corporation, Murrieta, CA (US)

(72) Inventors: Ekaratch Pankaew, Wangnoi (TH); Kuen Chee Ee, Chino, CA (US); Preecha Sudachun, Wangnoi (TH); David Glaess, Bangkok (TH); Chanatkarn Angsutanasombat, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,688

(22) Filed: May 8, 2024

(65) Prior Publication Data

US 2024/0290347 A1 Aug. 29, 2024

Related U.S. Application Data (63) Continuation of application No. 17/158,955, filed on Jan. 26, 2021, now Pat. No. 12,002,497.

(60) Provisional application No. 62/968,859, filed on Jan. 31, 2020.

(51) Int. Cl.
*G11B 5/48* (2006.01)

(52) U.S. Cl.
CPC ............ *G11B 5/4833* (2013.01); *G11B 5/486* (2013.01)

(58) Field of Classification Search
None
See application file for complete search history.

(56) References Cited

U.S. PATENT DOCUMENTS

| 5,883,758 | A | | 3/1999 | Bennin et al. | |
|---|---|---|---|---|---|
| 5,959,807 | A | * | 9/1999 | Jurgenson | G11B 5/4806 360/245.7 |
| 5,982,584 | A | | 11/1999 | Bennin et al. | |
| 6,515,832 | B1 | * | 2/2003 | Girard | G11B 5/4826 |

(Continued)

FOREIGN PATENT DOCUMENTS

| JP | 2007-287296 A | 11/2007 |
|---|---|---|
| JP | 2009-187650 A | 8/2009 |

(Continued)

OTHER PUBLICATIONS

Notification of Reasons for Rejection in Japanese Application No. 2022-546067, dated Aug. 6, 2024.

(Continued)

*Primary Examiner* — William J Klimowicz (74) *Attorney, Agent, or Firm* — DLA Piper LLP (US)

(57) ABSTRACT

A dielectric layer configured to overlay a spring metal layer in a suspension assembly is described. The dielectric layer includes a tongue portion including a proximate end and a distal end, trace portions extending from the tongue portion, and an aperture aligned with the void and defined by the tongue portion. The aperture includes an elongated opening with opposing ends partially aligning with the central opening of the void. The aperture further includes slits extending from the opposing ends of the elongated opening and at least partially aligned with slits of the void in the spring metal layer.

19 Claims, 7 Drawing Sheets

(56) References Cited

U.S. PATENT DOCUMENTS

| | | |
|---|---|---|
| 6,612,016 B1 | 9/2003 | Bennin et al. |
| 6,965,499 B1 | 11/2005 | Zhang et al. |
| 7,113,372 B2 | 9/2006 | Segar et al. |
| 7,384,531 B1 * | 6/2008 | Peltoma .................... C25D 5/12 |
| | | 360/235.1 |
| 7,489,493 B2 | 2/2009 | Thaveeprungsriporn et al. |
| 7,518,830 B1 | 4/2009 | Panchal et al. |
| 7,567,410 B1 | 7/2009 | Zhang et al. |
| 7,595,963 B1 * | 9/2009 | Chen .................... G11B 5/4853 |
| | | 360/245.9 |
| 7,663,843 B2 | 2/2010 | Yao |
| 7,697,237 B1 | 4/2010 | Danielson |
| 8,027,128 B2 | 9/2011 | Muraki et al. |
| 8,085,506 B1 | 12/2011 | Ee et al. |
| 8,085,508 B2 | 12/2011 | Hatch |
| 8,446,695 B1 * | 5/2013 | Ee ........................ G11B 5/4826 |
| | | 360/245.9 |
| 8,605,389 B1 * | 12/2013 | Pan ........................ G11B 5/486 |
| | | 360/245.9 |
| 8,702,998 B1 | 4/2014 | Guerini |
| 8,792,212 B1 | 7/2014 | Pan et al. |
| 8,792,213 B1 | 7/2014 | Vijay et al. |
| 8,947,831 B1 * | 2/2015 | Ee ........................ G11B 5/4873 |
| | | 360/245.3 |
| 8,976,491 B1 | 3/2015 | Chen et al. |
| 9,025,282 B1 | 5/2015 | Miller |
| 9,025,283 B1 * | 5/2015 | Puttichaem .......... G11B 5/4853 |
| | | 360/245.9 |
| 9,646,638 B1 | 5/2017 | Bjorstrom et al. |
| 10,002,628 B2 | 6/2018 | Bjorstrom |
| 10,373,634 B2 | 8/2019 | Pokornowski et al. |
| 10,566,016 B2 | 2/2020 | Yamada et al. |
| 12,002,497 B2 * | 6/2024 | Pankaew ................ G11B 5/486 |
| 2004/0226164 A1 | 11/2004 | Girard |
| 2005/0254175 A1 * | 11/2005 | Swanson .................. G11B 5/48 |
| | | 360/245.9 |
| 2008/0180850 A1 | 7/2008 | Rice et al. |
| 2011/0096438 A1 | 4/2011 | Takada et al. |
| 2011/0228426 A1 | 9/2011 | Zhou et al. |
| 2013/0248231 A1 * | 9/2013 | Tobias .................... H05K 1/05 |
| | | 29/829 |
| 2014/0168821 A1 | 6/2014 | Miller |
| 2014/0347765 A1 | 11/2014 | Miller et al. |
| 2015/0062758 A1 | 3/2015 | Miller et al. |
| 2015/0213818 A1 | 7/2015 | Imai et al. |
| 2016/0171995 A1 | 6/2016 | Bjorstrom |
| 2017/0330589 A1 | 11/2017 | Bjorstrom et al. |

FOREIGN PATENT DOCUMENTS

| | | |
|---|---|---|
| JP | 2010-146631 A | 7/2010 |
| JP | 2014-238895 A | 12/2014 |
| JP | 2016-519387 A | 6/2016 |
| JP | 2019-515410 A | 6/2019 |
| WO | 2017/197030 A1 | 11/2017 |

OTHER PUBLICATIONS

International Search Report and Written Opinion in International Application No. PCT/US2021/015301, mailed Apr. 21, 2021.
International Preliminary Report on Patentability in International Application No. PCT/US2021/015301, mailed Aug. 11, 2022.
Office Action in U.S. Appl. No. 17/158,955, mailed May 10, 2021.
Office Action in U.S. Appl. No. 17/158,955, mailed Aug. 18, 2021.
Office Action in U.S. Appl. No. 17/158,955, mailed Nov. 29, 2021.
Office Action in U.S. Appl. No. 17/158,955, mailed Jun. 30, 2022.
Office Action in U.S. Appl. No. 17/158,955, mailed Oct. 12, 2022.
Office Action in U.S. Appl. No. 17/158,955, mailed Mar. 30, 2023.
Office Action in U.S. Appl. No. 17/158,955, mailed Jul. 14, 2023.
Office Action in U.S. Appl. No. 17/158,955, mailed Oct. 23, 2023.
Notice of Allowance in U.S. Appl. No. 17/158,955, mailed Feb. 1, 2024.

* cited by examiner

SUSPENSION DAMPING

CROSS-REFERENCE TO RELATED APPLICATIONS

This application is a continuation of U.S. application Ser. No. 17/158,955 filed Jan. 26, 2021, which claims the benefit of U.S. Provisional Application No. 62/968,859 filed on Jan. 31, 2020, which is hereby incorporated by reference in its entirety.

FIELD

Embodiments of the disclosure relate to the field of suspensions for disk drives. More particularly, this disclosure relates to the field of flexures that are configured to be included in disk drive suspensions and provide for improved suspension damping.

BACKGROUND

Magnetic recording heads typically comprise a transducer and a slider. These are supported in proximity to a magnetic recording medium, usually a spinning disk with a magnetic coating, by a suspension assembly. The suspension includes a load beam that attaches to the slider with a read/write transducer assembly via a flexible gimbal device at one end and a flexible section of the suspension, namely the formed area, at the other end. The formed area in turn is connected to a suspension support arm. The suspension support arm connects to an actuator. It is desirable for the transducer suspension to be flexible in a direction perpendicular to the plane of the disk so that the suspension is able to follow any movement of the head due to disk run out or wobbling of the disk normal to its plane. If the transducer does not follow the out of plane motion of the disk, head to disk spacing variations will result. Additionally, the suspension should be extremely rigid in a plane parallel to that of the disk so the transducer can be accurately placed over a data track. The slider and the magnetic element are positioned over the proper track of data by a voice-coil powered actuator in order to read, write, and erase data.

Data is transferred to a magnetic recording medium in the form of magnetic flux reversals from a gap in the transducer. Recently, advances have been made that allow very high densities of data to be stored on a single disk. For accurate and dense data encoding, the read/write gap in the transducer must be maintained as close to the disk as possible at a constant height; typically, a few nanometers above the disk. The storage capacity of the disk is a strong function of the height of the read/write gap above the disk, i.e., the flying height. Storage capacity is also a function of the track density, i.e., the number of recording tracks available radially. This is determined by the accuracy with which the actuator motor can locate the transducer over a previously written track of data and follow that track as the disk spins. Therefore, the storage capacity of the disk is measured by the number of flux reversals per square inch. More precisely, the area density is calculated by the linear bit density, or the number of flux reversals per inch along a track, times the radial track density, or the number of tracks available radially. Typically, the linear bit density is an order of magnitude greater than the radial track density. The number of flux reversals per inch is extremely sensitive to the head to disk interface spacing; flying height variation significantly reduces the number of flux reversals per inch. Hence, it is very important to keep the head to disk spacing as constant as possible.

Suspension resonances are generally excited in the suspension during data seek and track following operations. However, there are also other sources that can cause the suspension to resonate, including external disturbances. In order to maximize the capacity of disk drives, it is necessary to control the resonant behavior of the suspension such that the suspension can have better track following performance when the actuator is active.

SUMMARY

A suspension is provided. The suspension includes a flexure, which includes a gimbal, a proximal end, and a distal end. The flexure having a longitudinal axis extending from the proximal end to the distal end. The gimbal includes a spring metal layer including a base portion, a tongue, and a pair of spring arms extending from the base portion to the tongue. The gimbal also includes a dielectric layer overlaying the spring metal layer and a conductive metal layer overlying the dielectric layer.

The conductive metal layer includes a first plurality of traces extending from the base portion to the tongue and a second plurality of traces extending from the base portion to the tongue. The suspension also includes a void formed in the spring metal layer and partially surrounding the tongue. A portion of the dielectric layer overlays a section of the void formed in the spring metal layer.

In some embodiments of the suspension, a portion of the first plurality of traces and a portion of the second plurality of traces are coupled over the void and extend towards the tongue. The void includes a central opening with opposing ends, and first and second channels extending from the opposing ends of the central opening. The dielectric layer can include a tongue portion, trace portions, and an aperture aligned with the void and defined by the tongue portion and the trace portions. The tongue portion includes a proximate end and a distal end. The trace portions extending from the distal end of the tongue portion. The aperture includes an elongated opening with opposing ends partially aligning with the central opening of the void, and slits extending from the opposing ends of the elongated opening and at least partially exposing the first and second channels of the void.

In some embodiments of the suspension, the slits of the aperture extend from the opposing ends of the elongated opening up to 40% of a length between the proximate end and the distal end of the tongue portion. Specifically, the slits of the aperture extend from the opposing ends of the elongated opening up to 25% of a length between the proximate end and the distal end of the tongue portion. In other embodiments, the slits of the aperture extend from the opposing ends of the elongated opening up to 80% of a length between the proximate end and the distal end of the tongue portion. Specifically, the slits of the aperture extend from the opposing ends of the elongated opening up to 50% of a length between the proximate end and the distal end of the tongue portion.

A dielectric layer is also provided. The dielectric layer includes a tongue portion, trace portions, and an aperture aligned with the void and defined by the tongue portion. The tongue portion includes a proximate end and a distal end. The trace portions extending from the proximate end of the tongue portion. The aperture includes an elongated opening with opposing ends partially aligning with the central opening of the void.

In some embodiments, the aperture further includes slits extending from the opposing ends of the elongated opening and at least partially exposing the first and second channels of the void. The slits of the aperture can extend from the opposing ends of the elongated opening up to 40% of a length between the proximate end and the distal end of the tongue portion. Specifically, the slits of the aperture extend from the opposing ends of the elongated opening up to 25% of a length between the proximate end and the distal end of the tongue portion. Alternatively, the slits of the aperture extend from the opposing ends of the elongated opening up to 80% of a length between the proximate end and the distal end of the tongue portion. Specifically, the slits of the aperture extend from the opposing ends of the elongated opening up to 50% of a length between the proximate end and the distal end of the tongue portion.

A flexure is also provided. The flexure includes a gimbal, a proximal end, and a distal end. The flexure having a longitudinal axis extending from the proximal end to the distal end. The gimbal includes a spring metal layer including a base portion, a tongue, and a pair of spring arms extending from the base portion to the tongue. The gimbal also includes a dielectric layer overlaying the spring metal layer and a conductive metal layer overlying the dielectric layer.

The conductive metal layer includes a first plurality of traces extending from the base portion to the tongue and a second plurality of traces extending from the base portion to the tongue. The flexure also includes a void formed in the spring metal layer and partially surrounding the tongue. A portion of the dielectric layer overlays a section of the void formed in the spring metal layer.

In some embodiments of the flexure, a portion of the first plurality of traces and a portion of the second plurality of traces are coupled over the void and extend towards the tongue. The void includes a central opening with opposing ends, and first and second channels extending from the opposing ends of the central opening. The dielectric layer can include a tongue portion, trace portions, and an aperture aligned with the void and defined by the tongue portion and the trace portions. The tongue portion includes a proximate end and a distal end. The trace portions extending from the distal end of the tongue portion. The aperture includes an elongated opening with opposing ends partially aligning with the central opening of the void, and slits extending from the opposing ends of the elongated opening and at least partially exposing the first and second channels of the void.

In some embodiments of the flexure, the slits of the aperture extend from the opposing ends of the elongated opening up to 40% of a length between the proximate end and the distal end of the tongue portion. Specifically, the slits of the aperture extend from the opposing ends of the elongated opening up to 25% of a length between the proximate end and the distal end of the tongue portion. In other embodiments of the flexure, the slits of the aperture extend from the opposing ends of the elongated opening up to 80% of a length between the proximate end and the distal end of the tongue portion. Specifically, the slits of the aperture extend from the opposing ends of the elongated opening up to 50% of a length between the proximate end and the distal end of the tongue portion.

Other features and advantages of embodiments of the present disclosure will be apparent from the accompanying drawings and from the detailed description that follows.

BRIEF DESCRIPTION OF THE DRAWINGS

Embodiments of the present disclosure are illustrated by way of example and not limitation in the figures of the accompanying drawings, in which like references indicate similar elements and in which.

DETAILED DESCRIPTION

A suspension and components thereof are described herein. Such a suspension can included, but is not limited to, a dual-stage actuation (DSA) suspension and a tri-stage actuation suspension. The suspension, according to some embodiments, includes a flexure, which includes a gimbal, a proximal end, and a distal end. The flexure having a longitudinal axis extending from the proximal end to the distal end. The gimbal includes a spring metal layer including a base portion, a tongue, and a pair of spring arms extending from the base portion to the tongue. The gimbal also includes a dielectric layer overlaying the spring metal layer and a conductive metal layer overlying the dielectric layer.

The conductive metal layer includes a first plurality of traces extending from the base portion to the tongue and a second plurality of traces extending from the base portion to the tongue. The suspension also includes a void formed in the spring metal layer and partially surrounding the tongue. A portion of the first plurality of traces and a portion of the second plurality of traces are coupled over the void and extend towards the tongue. A portion of the dielectric layer overlays a section of the void formed in the spring metal layer. The disclosed flexure provides additional stiffness, which improves the mechanical properties of the suspension.

Figure 1:
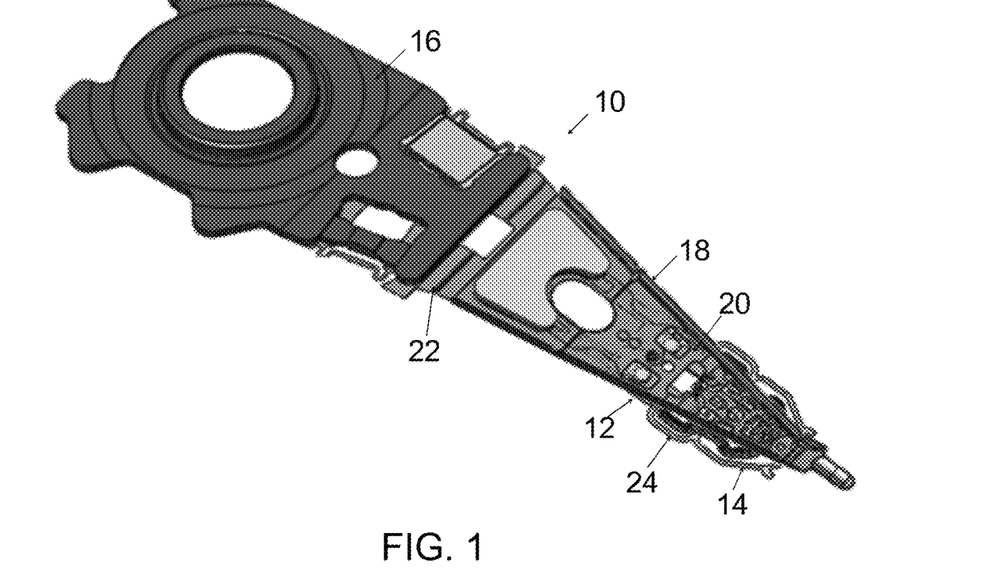
FIG. 1 is an isometric view of a suspension having a flexure, in accordance with an embodiment of the disclosure.

FIG. 1 is an isometric view of a suspension 10 having a flexure 12 with a co-located or gimbal-based actuation structure 14, in accordance with an embodiment of the disclosure. As shown in FIG. 1, the suspension 10 includes a baseplate 16 as a proximal mounting structure. The suspension 10 also includes a load beam 18 having a rigid or beam region 20 coupled to the baseplate 16 along a spring or hinge region 22. The load beam 18 can be formed from stainless steel. The flexure 12 includes a gimbal 24 at the distal end of the flexure 12. A co-located or gimbal-based actuation structure 14 is located on the gimbal 24, adjacent the distal end of the load beam 18.

Figure 2:
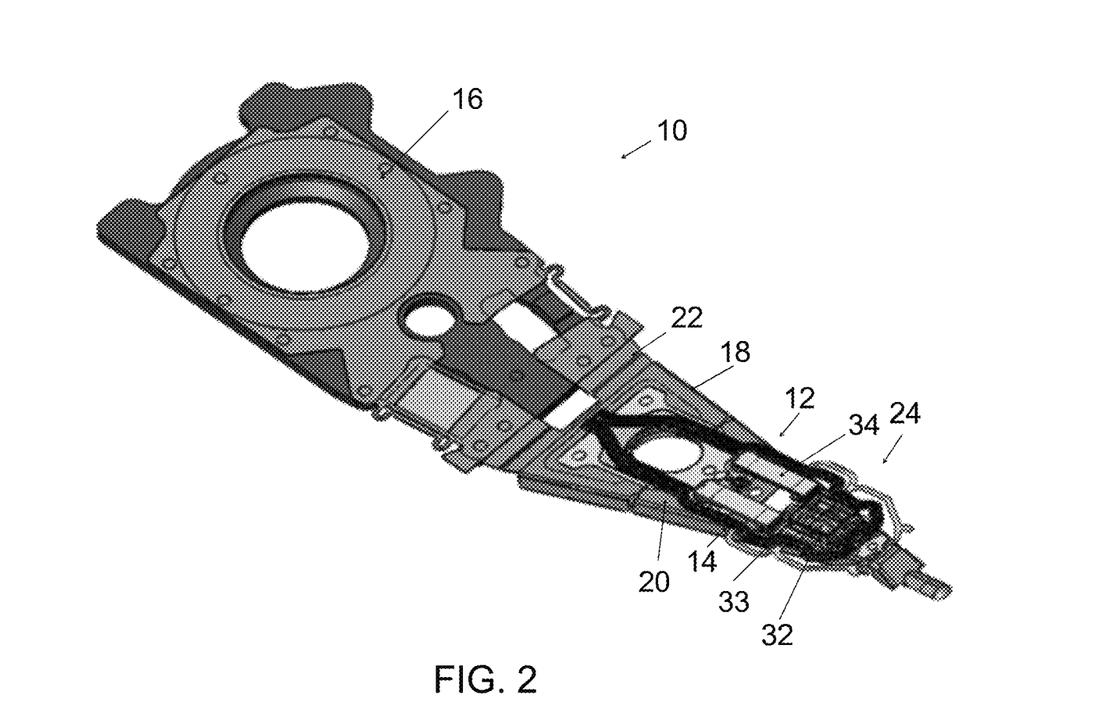
FIG. 2 is a perspective view of an underside of the suspension, in accordance with an embodiment of the disclosure.

FIG. 2 is a perspective view of an underside of the suspension 10, in accordance with an embodiment of the disclosure. A head slider 32 is mounted to a tongue 33 of the gimbal 24, on the side of the suspension 10 that is opposite the load beam 18. The co-located or gimbal-based actuation structure 14 includes a motor 34, which is a PZT or other piezoelectric actuator in the illustrated embodiment, mounted to the gimbal 24 of the flexure 12 between the load beam 18 and the head slider 32. In response to electrical drive signals applied to the motor 34, the motor drives portions of the gimbal 24, including the tongue 33 and slider 32, about a generally transverse tracking axis. Proximal and distal, as used herein, refers to the relative direction along the longitudinal axis of the suspension while lateral refers to the left and/or right directions orthogonal to the longitudinal axis of the suspension. For example, the baseplate 16 is proximal of the load beam 18 while opposite ends of the motor 34 extend laterally.

Figure 3:
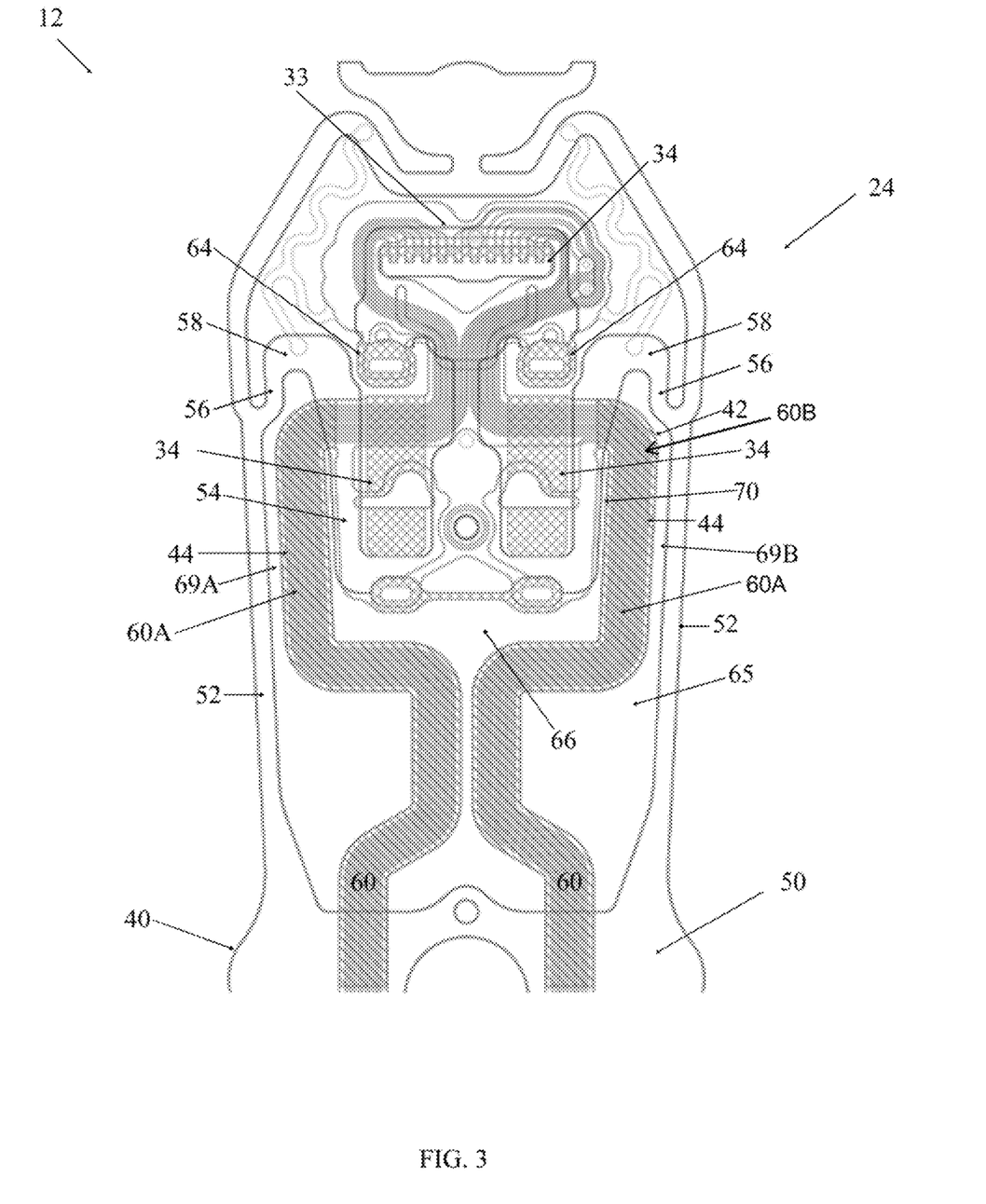
FIG. 3 illustrates the flexure of the suspension, in accordance with embodiments of the disclosure.

FIG. 3 illustrates the flexure 12 of the suspension 10, in accordance with embodiments of the disclosure. The flexure 12 is formed from overlaying spring metal such as stainless-steel layer 40, polyimide or other dielectric layer 42, copper or other conductive material layer 44 and coverlay, such as a polyimide layer. It will be understood that the stainless-steel layer 40 could alternatively be formed from another metal or rigid material. The dielectric layer 42 generally electrically isolates structures formed in the conductive material layer 44 from adjacent portions of the stainless-steel layer 40.

The coverlay generally covers and protects the structures formed in the conductive material layer 44. The gimbal 24 includes the spring arms 52 and the tongue 33. The spring arms 52 extend from a base portion 50 of the stainless-steel layer 40. A mounting region 54, which is part of the tongue 33, is supported between the spring arms 52 by a pair of struts 56 that extend from support regions 58, extending from the spring arms 52. In some embodiments, the pair of struts 56 is the only part of the stainless-steel layer 40 that connects or otherwise supports the tongue 33 between the spring arms 52.

Specifically, the struts 56 can be the only structural linkage between the spring arms 52 and the tongue 33. Also, the struts 56, in connecting with the tongue 33, can be the only part of the stainless-steel layer 40 that connects between the spring arms 52 distal of the base portion 50. As shown, the struts 56 are offset from one another with respect to the longitudinal axis of the flexure 12 or otherwise configured to enable rotational movement of the mounting region 54 about the tracking axis with respect to the spring arms 52. The struts 56 can each be the narrowest part of the stainless-steel layer 40 in, for example, an X-Y plane while the thickness of the stainless-steel layer 40 can be consistent along the flexure 12.

A plurality of traces 60 formed in the conductive material layer 44 extend between the base portion 50 and the tongue 33 along a flexible circuit formed in the dielectric layer 42. A number of the traces 60 terminate at locations on a distal region on the tongue 33 and are configured to be electrically attached to terminals of the read/write head on the slider. Other traces 60 terminate at a contact such as a copper pad 64 on the tongue 33, below the motor 34. Portions of the dielectric layer 42 extend underneath the conductive material layer 44 onto the mounting region 54 and across a portion of the support regions 58. The tongue 33 projects longitudinally toward the base portion 50 and is surrounded on three sides by a void 65 or aperture through the flexure 12.

The tongue 33 projects longitudinally toward the base portion 50 and is surrounded on three sides by a void 65 or aperture through the flexure 12. The void 65 includes a central opening 66, a first channel 69A and a second channel 69B. The first channel 69A can be defined by the spring arm 52, the strut 56, the support region 58 and the mounting region 54. A first portion of the trace 60A formed in the conductive material layer 44 extends from the mounting region 54 over the first channel 69A, where it is suspended from the stainless-steel layer 40. The first portion of the trace 60A is suspended over the void 65 and mounted on the base portion 50.

The second channel 69B can be defined by the spring arm 52, the strut 56, the support region 58 and the mounting region 54. A second portion of the trace 60B formed in the conductive material layer 44 extends from the mounting region 54 over the second channel 69B, where it is suspended from the stainless-steel layer 40. The second portion of the trace 60B is suspended over the void 65 and mounted on the base portion 50.

The dielectric layer 42 has an aperture 70 corresponding with the central opening 66, the first channel 69A, and the second channel 69B. Some embodiments of the dielectric layer are illustrated in further detail with respect to FIGS. 4-7.

Figure 4:
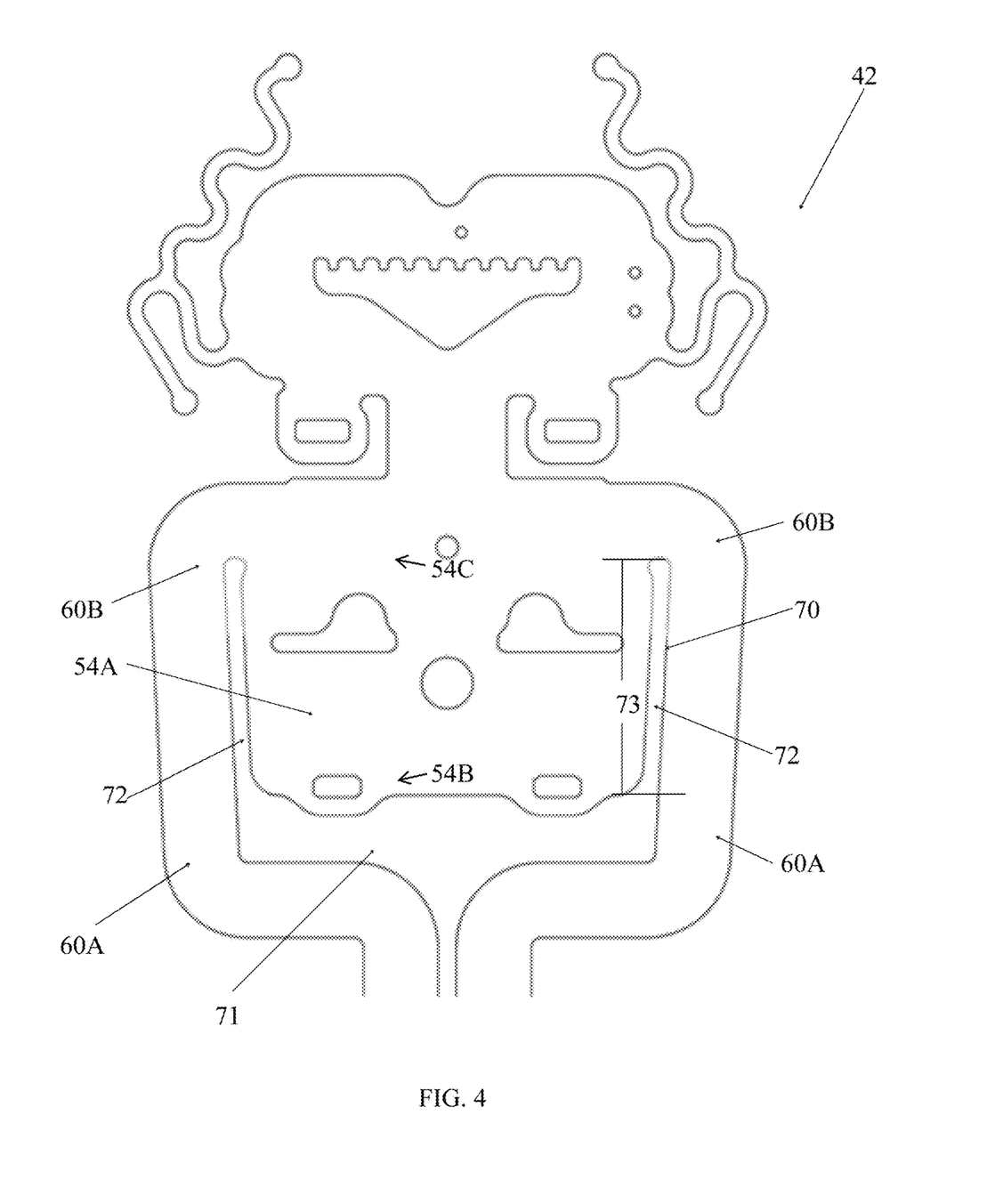
FIG. 4 illustrates the dielectric layer of the flexure, in accordance with embodiments of the disclosure.

FIG. 4 illustrates a dielectric layer 42 of the flexure, in accordance with embodiments of the disclosure. The dielectric layer 42 includes a tongue portion 54A, lower trace portions 60A, upper trace portions 60B, and an aperture 70. The aperture 70 is defined by the tongue portion 54A, the lower trace portions 60A, and the upper trace portions 60B. The upper trace portions 60B extend from the tongue portion 54A. The tongue portion 54A can include a proximate end 54B and a distal end 54C. The aperture 70 of the dielectric layer 42 includes an elongated opening 71 with opposing ends. The elongated opening 71 is defined by the lower trace portions 60A and the proximate end 54B of the tongue portion 54A. The aperture 70 also includes slits 72 extending from the opposing ends of the elongated opening 71. The slits 72 are defined by the tongue portion 54A and the upper trace portions 60B. The elongated opening 71 at least partially aligns with the central opening of the void (65 shown in FIG. 3), and the slits 72 at least partially expose the first and second channels (69A, 69B of the void 65 shown in FIG. 3). The slits 72 extend a full-length 73 between the proximate end 54B of the tongue portion 54A and the upper trace portions 60B that extend from the tongue portion 54A. For some embodiments, the full length 73 is in a range including 0.6 millimeters (mm) to 0.9 mm. According to some embodiments, the upper trace portions 60B is defined by the width of the plurality of traces 60 in the conductive material layer and configured to be disposed on the dielectric layer 42. The width of the upper trace portions 60B, according to some embodiments, is in a range including 0.2 mm to 0.25 mm. For some embodiments, the illustrated dielectric layer 42 is formed separately from the suspension 10 and applied to the suspension 10.

Figure 5:
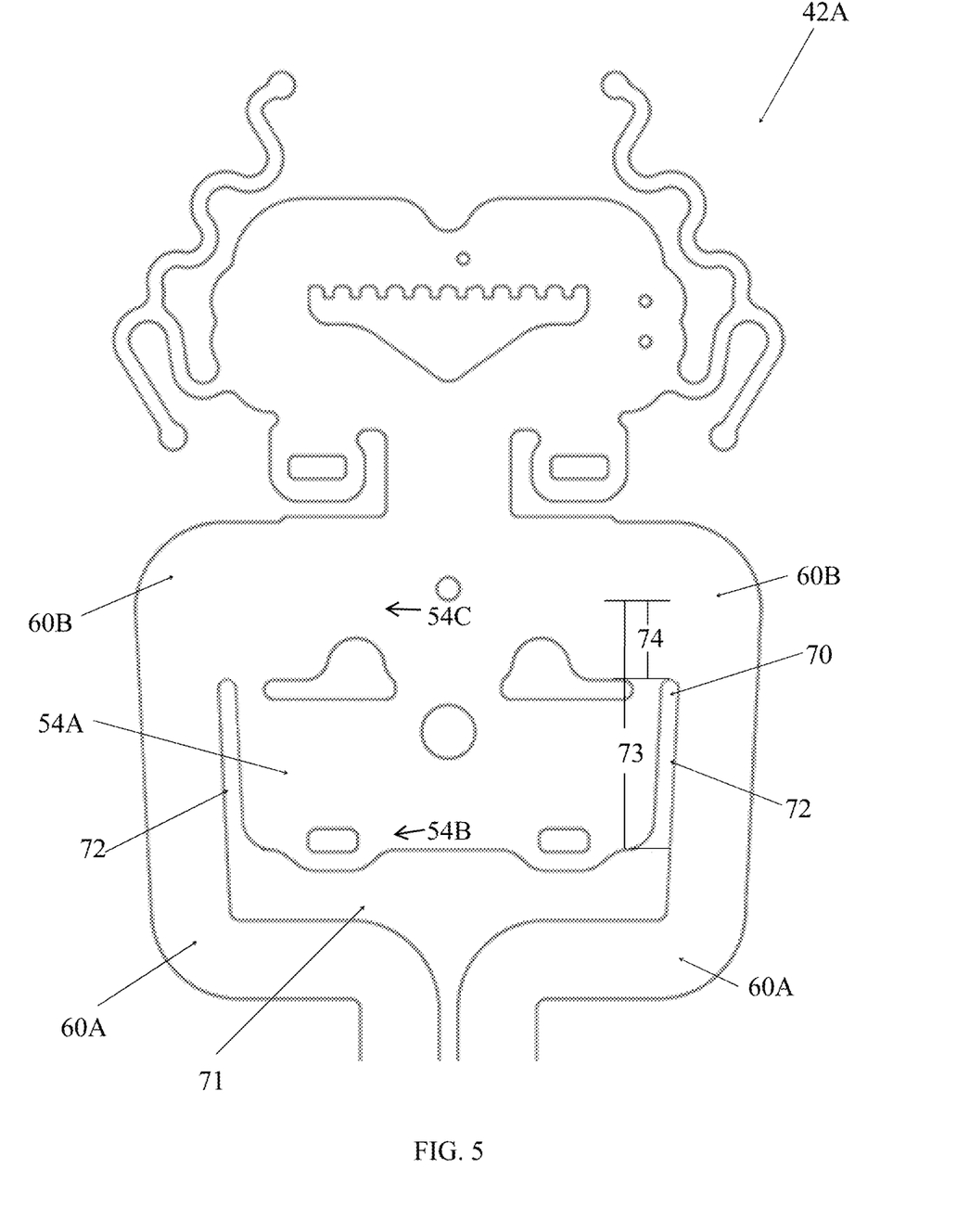
FIG. 5 illustrates the dielectric layer of the flexure, in accordance with embodiments of the disclosure.

FIG. 5 illustrates a dielectric layer 42A of the flexure, in accordance with embodiments of the disclosure. As discussed above, the dielectric layer 42A includes a tongue portion 54A, lower trace portions 60A, upper trace portions 60B, and an aperture 70. The aperture 70 is defined by the tongue portion 54A, the lower trace portions 60A, and the upper trace portions 60B. The upper trace portions 60B extend from the distal end 54C of the tongue portion 54A. The elongated opening 71 is defined by the lower trace portions 60A and the proximate end 54B of the tongue portion 54A. The slits 72 are defined by the tongue portion 54A and the upper trace portions 60B, reduced by a reduction length 74. The slits 72 extend less than the full-length 73, described above, by the reduction length 74. For some embodiments, the reduction length 74 is the distance from the distal end of the slits 72 to a proximal end of the plurality of traces 60 in the conductive material layer that are disposed on or will be disposed on the upper trace portion 60B of the dielectric layer 42A. The reduction 74 is between 1 and 40 percent reduction of the full-length 73. Specifically, the reduction length is 25% of the slit 72 length between the proximate end 54B of the tongue portion 54A towards the distal end 54C of the tongue portion 54A. The reduction of the slit 72 increases the size of the dielectric layer 42A, by increasing dielectric material at the upper trace portions 60B.

Figure 6:
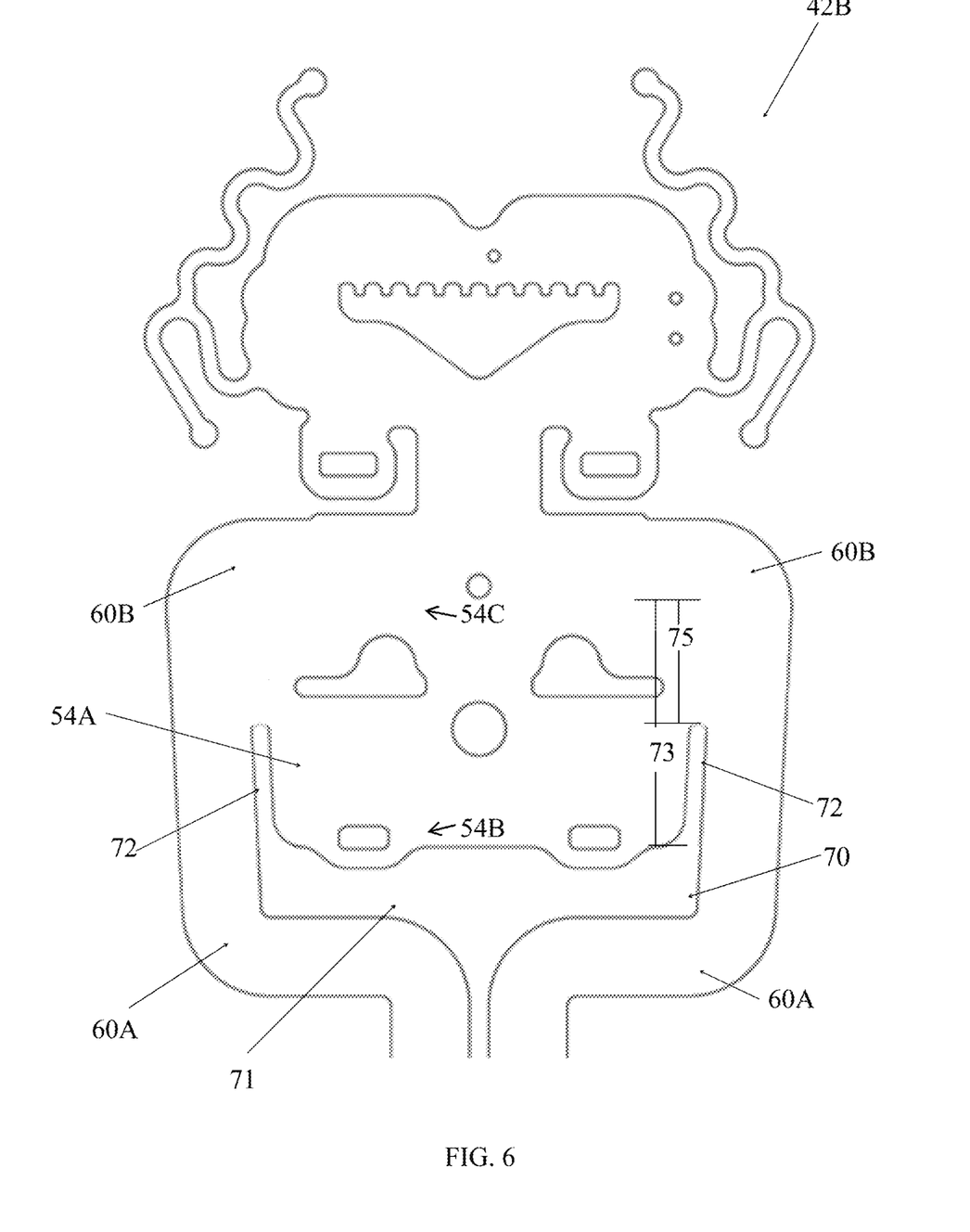
FIG. 6 illustrates the dielectric layer of the flexure, in accordance with embodiments of the disclosure.

FIG. 6 illustrates a dielectric layer 42B of the flexure, in accordance with embodiments of the disclosure. The dielectric layer 42B includes a tongue portion 54A, lower trace portions 60A, upper trace portions 60B, and an aperture 70. The aperture 70 is defined by the tongue portion 54A, the lower trace portions 60A, and the upper trace portions 60B. The upper trace portions 60B extend from the distal end 54C of the tongue portion 54A. The elongated opening 71 is defined by the lower trace portions 60A and the proximate end 54B of the tongue portion 54A. The slits 72 are defined by the tongue portion 54A and the upper trace portions 60B, reduced by a reduction length 75. The slits 72 extend less than the full-length 73, described above, by the reduction length 75. For some embodiments, the reduction length 75 is the distance from the distal end of the slits 72 to a proximal end of the plurality of traces 60 in the conductive material layer that are disposed on or will be disposed on the upper trace portion 60B of the dielectric layer 42B. The reduction length 75 is between 41 and 99 percent length reduction of the full-length 73. Specifically, the reduction length is 50% of the slit 72 length between the proximate end 54B of the tongue portion 54A towards the distal end 54C of the tongue portion 54A. The reduction of the slit 72 increases the size of the dielectric layer 42B, by increasing dielectric material at the upper trace portions 60B.

Figure 7:
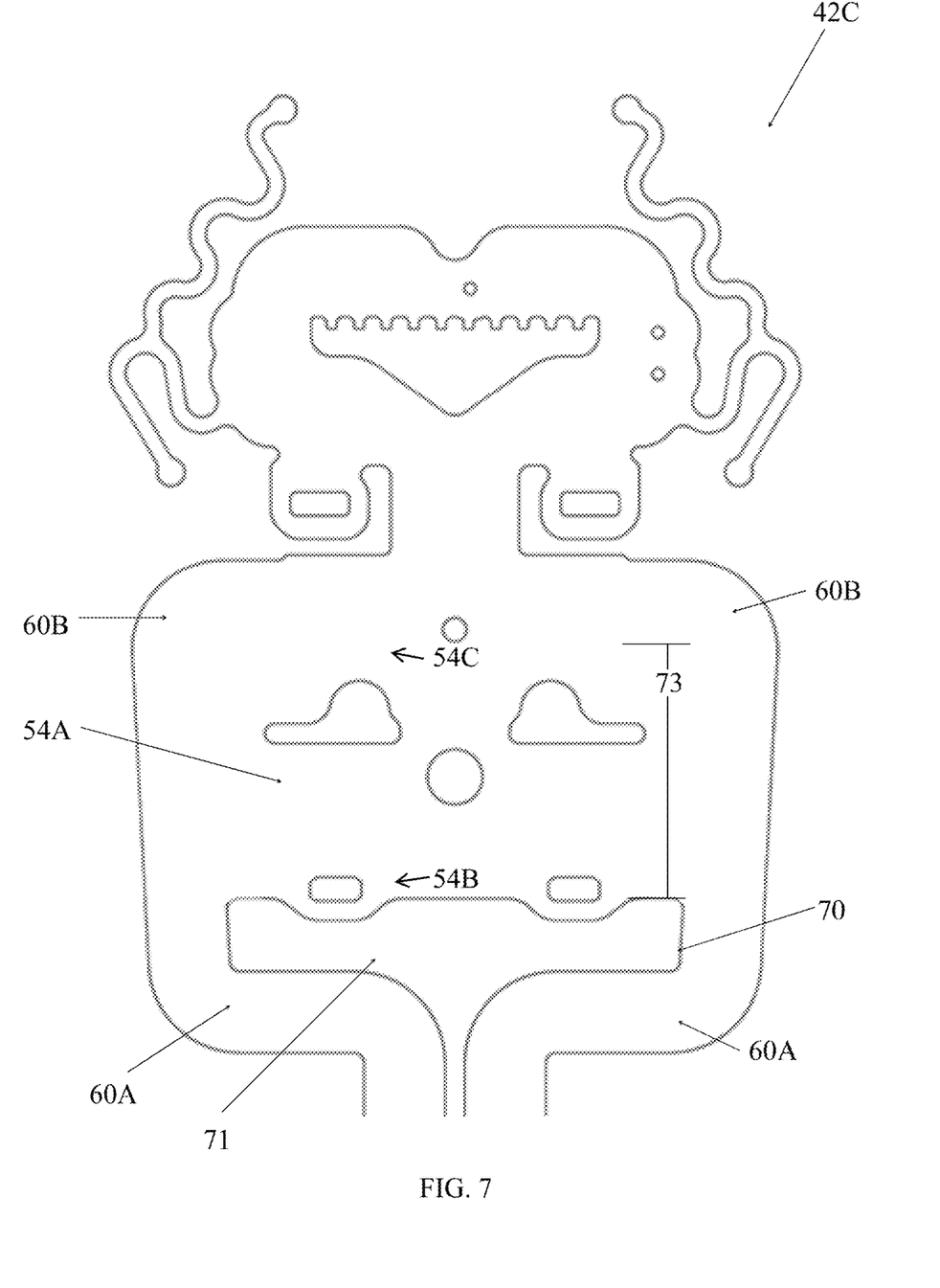
FIG. 7 illustrates the dielectric layer of the flexure, in accordance with embodiments of the disclosure.

FIG. 7 illustrates a dielectric layer 42C of the flexure, in accordance with embodiments of the disclosure. The dielectric layer 42C includes a tongue portion 54A, lower trace portions 60A, and an aperture 70. The aperture 70 is defined by the tongue portion 54A and the lower trace portions 60A. The aperture 70 does not include slits extending from the opposing ends of the elongated opening 71 towards the upper trace portions 60B. Instead, the tongue portion 54A is extended in width to include and couple with the trace portions 60A. There may be a full fill-in of polyimide in place of the previous slits. The full fill-in of polyimide further increases the size of the dielectric layer 42C. Referring momentarily back to FIG. 3, the increased dielectric layer 42C provides even more coverage on the mounting 54 and across a larger portion of the support regions 58, in comparison to the dielectric layer 42B (described above).

The dielectric layer 42C, such as the embodiment illustrated in FIG. 7, incorporates the full fill-in. This configuration has a very low to non-existent trace mode frequency. A suspension incorporating the dielectric layer 42, with the slits 72 that extend the full-length 73, such as the embodiment illustrated in FIG. 4 also exemplifies very low to non-existent trace mode frequency. The suspension incorporating the partial fill-in configurations of the dielectric layers 42A and 42B, such as embodiments illustrated in FIG. 5 and FIG. 6, respectively, exhibited increased trace mode frequency, increased gimbal pitch and roll stiffness (Kp, Kr), and a decreased T1-FX phase range from that of a suspension including slits that extend the full-length. The term "z-height" or Z-ht as used herein refers to the distance from the baseplate flange to the data disk surface. As the polyimide material increases to 50% (dielectric layer 42B), the trace mode frequency increases from that of a suspension including slits that extend the full-length.

A suspension incorporating a reduced slit exhibited an increased stroke, increase in gimbal pitch, and an increase in roll stiffness over an embodiment with a full-length slit. The increased material, and subsequent reduction of the slit increases the rigidity of the suspension, particularly where the suspension is laterally bent.

The increased rigidity of the suspension in the direction in which it is laterally bent causes a resonance peak P to appear at a relatively high frequency. For example, the suspension incorporating the dielectric layer without a polyimide slit exhibits little to no trace mode resonance. The trace mode resonance appears at a higher frequency as the slits in the dielectric layer are decreased. For example, the trace mode resonance of the suspension incorporating the dielectric layer 42 is 8.3 kHz. In comparison, the trace mode of the suspension incorporating the dielectric layer 42B is 11.9 kHz. As the slits in the dielectric layer are decreased the T1-FX phase range is reduced. However, as the slit is reduced by 25%(25% fill) the T1-FX phase range increased seemingly due to less separation of frequency of trace mode and T1-FX mode.

Figure 8:
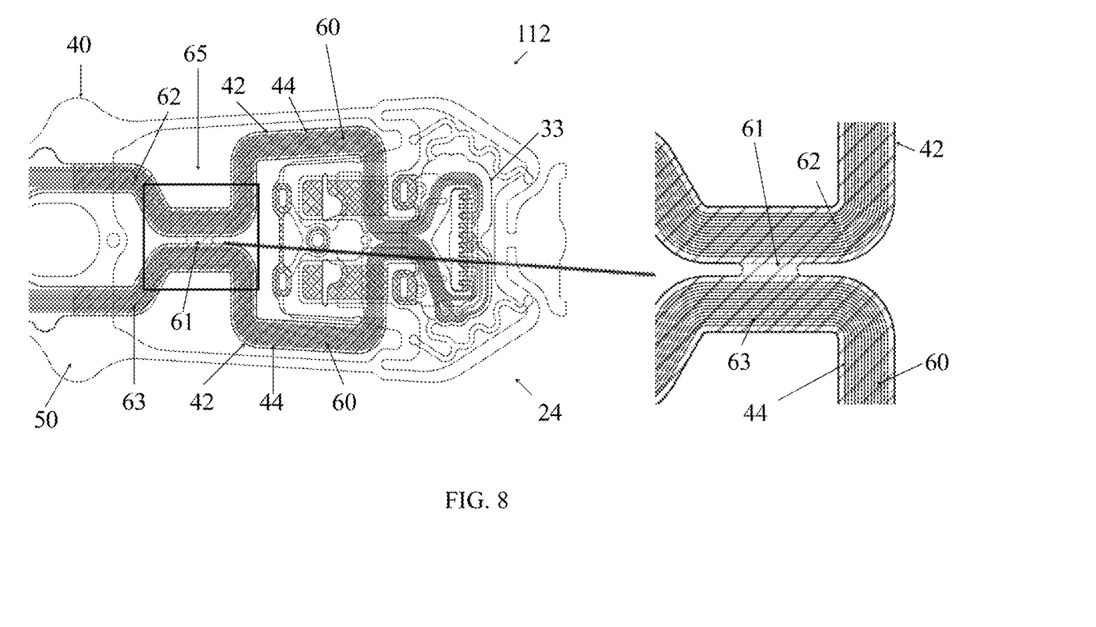
FIG. 8 illustrates a flexure 112, in accordance with embodiments of the disclosure.

FIG. 8 illustrates a flexure 112, in accordance with embodiments of the disclosure. The flexure 112 includes a plurality of traces 60 formed in the conductive material layer 44. The traces 60 extend between the base portion 50 and the tongue 33 along a flexible circuit formed in the dielectric layer 42. As indicated above, the tongue 33 projects longitudinally toward the base portion 50 and is surrounded on three sides by a void 65 or aperture through the flexure. As the traces 60 extend from the base portion 50, a first plurality 62 of the traces 60 converge towards a second plurality 63 of the traces 60 over the void 65. The first plurality 62 and the second plurality 63 of the traces 60 may be coupled via bridge 61. The bridge 61 includes a portion of the conductive material layer 44, supported by a portion of the dielectric layer 42.

Embodiments of the suspension that incorporated the bridge 61 exhibited a trace mode frequency shift. The suspension that incorporated the bridge 61 also exhibited a yaw frequency increase over those without a bridge. The suspension that incorporated the bridge 61 also exhibited a stroke increase and an increase of roll stiffness (Kr) over those without a bridge. A suspension incorporating the bridge 61 coupling the first and second plurality (62, 63) of traces 60 exhibited an increase in the stroke, and an increase in roll stiffness.

The increased rigidity of the suspension in the direction in which it is laterally bent causes a resonance peak P to appear at a relatively high frequency. For example, the suspension incorporating the bridge 61 coupling the first plurality 62 of traces 60 and the second plurality 63 of traces 60 exhibit a yaw frequency increase over a suspension without a bridge.

While various embodiments have been described above, it should be understood that they have been presented by way of example and not limitation. It will be apparent to persons skilled in the relevant art(s) that various changes in form and detail can be made therein without departing from the spirit and scope. For example, the bridge 61 configuration and the dielectric layers 42A-42C were discussed separately; however, it should be appreciated that the bridge configuration 61 can be implemented in either dielectric layers 42A-42C. Thus, embodiments include a bridge and split used independently or together to tune a suspension to have characteristics for a desired performance.

In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A suspension comprising:
   a flexure including a gimbal, a proximal end, and a distal end, the gimbal including a spring metal layer having a base portion, a tongue, and a pair of spring arms, a dielectric layer overlaying the spring metal layer, and a conductive metal layer including a first plurality of traces and a second plurality of traces extending from the base portion to the tongue;
   a void formed in the spring metal layer between the tongue and the base portion and partially surrounding the tongue, wherein an aperture is formed in the dielectric layer with the aperture defined by a tongue portion and trace portions of the dielectric layer,
   the aperture includes an elongated opening with opposing ends partially aligning with an opening of the void, a first slit and a second slit extending from the opposing ends of the elongated opening toward the tongue, wherein the slits extend toward the tongue at less than a full-length position that extends to the first plurality of traces and the second plurality of traces.

2. The suspension of claim 1, wherein the slits extend about half way between the elongated opening and the full-length position to the first plurality of traces and the second plurality of traces.

3. The suspension of claim 1, wherein the slits extend less than half way between the elongated opening and the full-length position to the first plurality of traces and the second plurality of traces.

4. The suspension of claim 1, wherein the first slit and the second slit of the aperture extend from the opposing ends of the elongated opening up to 40% of a length between a proximate end and a distal end of the tongue portion.

5. The suspension of claim 1, wherein the first slit and the second slit of the aperture extend from the opposing ends of the elongated opening up to 25% of a length between a proximate end and a distal end of the tongue portion.

6. The suspension of claim 1, wherein the first slit and the second slit of the aperture extend from the opposing ends of the elongated opening up to 80% of a length between a proximate end and a distal end of the tongue portion.

7. The suspension of claim 1, wherein the first slit and the second slit of the aperture extend from the opposing ends of the elongated opening up to 50% of a length between a proximate end and a distal end of the tongue portion.

8. A dielectric layer configured to overlay a spring metal layer in a suspension assembly, the dielectric layer part of a flexure including a gimbal, a proximal end, and a distal end, the dielectric layer comprising:
   a tongue portion including a proximate end and a distal end;
   trace portions extending from the distal end of the tongue portion, the trace portions comprising a first plurality of traces and a second plurality of traces; and
   an aperture configured to be aligned with a void of the spring metal layer, the aperture includes an elongated opening with opposing ends and at least a first slit and second slit each extending less than a full-length from the aperture to the trace portions, the void formed in the spring metal layer between the tongue portion and a base portion and partially surrounding the tongue portion.

9. The dielectric layer of claim 8, wherein the first slit and the second slit extend from the opposing ends of the elongated opening and are at least partially aligned with channels of the void of the spring metal layer.

10. The dielectric layer of claim 9, wherein the first slit and the second slit of the aperture extend from the opposing ends of the elongated opening up to 40% of a length between the proximate end and the distal end of the tongue portion.

11. The dielectric layer of claim 9, wherein the first slit and the second slit of the aperture extend from the opposing ends of the elongated opening up to 25% of a length between the proximate end and the distal end of the tongue portion.

12. The dielectric layer of claim 9, wherein the first slit and the second slit of the aperture extend from the opposing ends of the elongated opening up to 80% of a length between the proximate end and the distal end of the tongue portion.

13. The dielectric layer of claim 9, wherein the first slit and the second slit of the aperture extend from the opposing ends of the elongated opening up to 50% of a length between the proximate end and the distal end of the tongue portion.

14. The dielectric layer of claim 9, wherein a portion of the trace portions is configured to couple over the void of the spring metal layer.

15. A flexure comprising:
   a gimbal, a proximal end, and a distal end, the gimbal includes a spring metal layer including a base portion, a tongue, and a pair of spring arms extending from the base portion to the tongue, a dielectric layer overlaying the spring metal layer and a conductive metal layer overlying the dielectric layer, the conductive metal layer including a first plurality of traces and a second plurality of traces extending from the base portion to the tongue;
   a void formed in the spring metal layer between the tongue and the base portion and partially surrounding the tongue, wherein an aperture is formed in the dielectric layer the aperture aligned with the void and defined by a tongue portion and trace portions of the dielectric layer,
   the aperture includes an elongated opening with opposing ends partially aligning with the central opening of the void, and a first slit and a second slit extending from the opposing ends of the elongated opening, wherein the slits extend toward the tongue at less than a full-length position that extends to the first plurality of traces and the second plurality of traces.

16. The flexure of claim 15, wherein the first slit and the second slit of the aperture extend from the opposing ends of the elongated opening up to 40% of a length between a proximate end and a distal end of the tongue portion.

17. The flexure of claim 15, wherein the first slit and the second slit of the aperture extend from the opposing ends of the elongated opening up to 25% of a length between a proximate end and a distal end of the tongue portion.

18. The flexure of claim 15, wherein the first slit and the second slit of the aperture extend from the opposing ends of the elongated opening up to 80% of a length between a proximate end and a distal end of the tongue portion.

19. The flexure of claim 15, wherein the first slit and the second slit of the aperture extend from the opposing ends of the elongated opening up to 50% of a length between a proximate end and a distal end of the tongue portion.

\* \* \* \* \*